Oct. 17, 1950     W. W. HANSEN ET AL     2,525,901

AUTOMATIC POWER BRIDGE

Original Filed Feb. 4, 1942

INVENTORS
WILLIAM W. HANSEN, DECEASED
BY BETSY ROSS HANSEN, EXECUTRIX
JOHN R. WOODYARD
EDWARD L. GINZTON
BY
Paul B. Hunter
ATTORNEY Patented Oct. 17, 1950

2,525,901

UNITED STATES PATENT OFFICE 2,525,901

AUTOMATIC POWER BRIDGE

William W. Hansen, deceased, late of Stanford University, Calif., by Betsy Ross Hansen, executrix, Stanford University, Calif., and John R. Woodyard, Berkeley, and Edward L. Ginzton, Menlo Park, Calif.; said William W. Hansen and John R. Woodyard and Edward L. Ginzton assignors to The Sperry Corporation, a corporation of Delaware Original application February 4, 1942, Serial No. 429,508. Divided and this application October 5, 1949, Serial No. 119,612

13 Claims. (Cl. 171—95)

This invention relates to devices for measuring ultra high frequency power, and particularly to apparatus for automatically accomplishing measurement and indication of ultra high frequency power.

This application is a division of application Serial No. 429,508, filed February 4, 1942.

The principal object of the invention is to provide improved apparatus of high stability for measuring ultra high frequency power automatically, and for giving a substantially instantaneous indication of the power level, without requiring manual adjustments of power measuring bridges, and without requiring computations.

In accordance with a principal feature of the present invention, a power-substitution bridge is arranged to receive low frequency power, and one arm of the bridge is arranged to receive ultra high frequency power in addition thereto. At least part of the bridge arm which receives the ultra high frequency power is made of a material selected for a relatively high temperature-coefficient of resistivity, so that the degree of unbalance of the bridge tends to change appreciably in response to a change in the ultra high frequency power supplied thereto. An automatic system is provided for acting substantially immediately upon a departure from a condition of substantial balance in the bridge due to a change in the ultra high frequency power (rate of ultra high frequency energy dissipation in the aforementioned high-temperature-coefficient bridge arm part) to accomplish a substantially equal change in the opposite sense of the low frequency power supplied to this part of the bridge, and thus to keep the total energy consumption and the temperature of the high-coefficient resistor substantially constant. An instrument is provided for responding to the variation of the low frequency power supplied to the bridge, and this instrument is so calibrated as to provide a direct indication of the ultra high frequency power or rate of ultra high frequency energy dissipation in the high-coefficient resistor arm of the bridge.

A version of this automatic direct-reading bridge system will now be described, with reference to the drawings, wherein.

Figure 1:
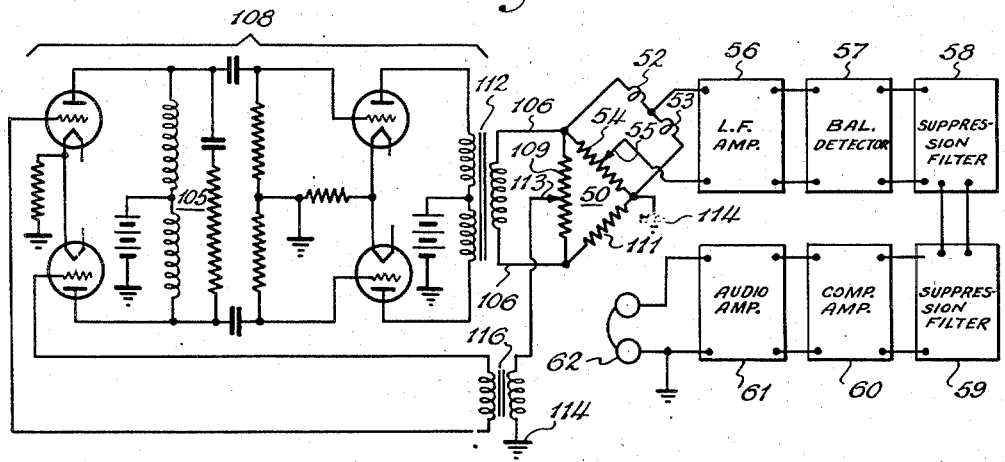
Fig. 1 is a schematic circuit diagram of a bridge system embodying the above-mentioned features.

Referring now to Fig. 1, a low frequency oscillator 108 is provided, shown as comprising a two-stage amplifier circuit with regenerative feed-back from the output to the input and having a low-Q resonant circuit 105. A suitable operating frequency for this circuit is a frequency of the order of 10,000 cycles per second.

The output of oscillator 108 is fed to a bridge circuit 50, one pair of arms of which is composed of the two portions of a potentiometer 109. A third arm comprises fixed resistor 111. The fourth arm comprises two parallel connected circuits, one being potentiometer 54 and the other being a series-connected hot wire element 52 and compensating resistor 53. The hot wire element 52 and the compensating resistor 53 are both temperature-sensitive elements, i. e., elements having high temperature coefficients of resistivity, which may be constructed and assembled according to any of the arrangements shown in Figs. 2, 3 and 4.

Figure 2:
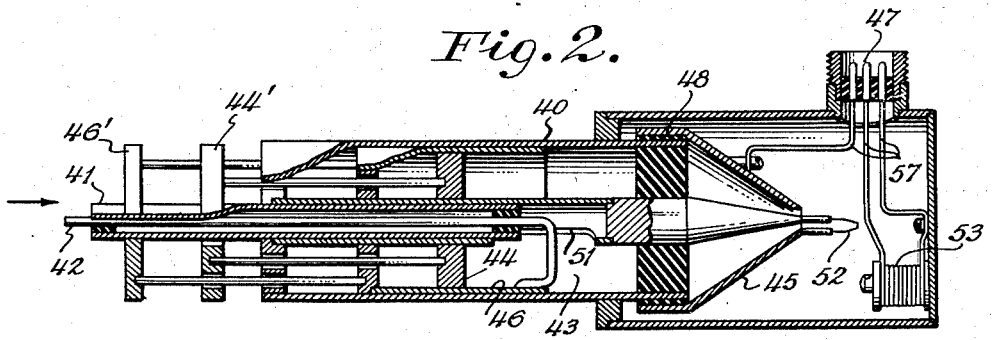
Fig. 2 is an illustration of an arrangement of the ultra high frequency energy transmission system, showing the high-temperature-coefficient resistor, and the temperature-sensitive compensating resistor of the circuit diagram of Fig. 1.

The arrangement in Fig. 2 is a device containing hot wire element 52 and compensating resistor 53, and arranged in such a way as to provide for efficient transmission of ultra high frequency energy into hot wire element 52. Moreover, this apparatus is arranged in such a way that changes of ambient temperature provide similar effects in elements 52 and 53, for reasons which will appear subsequently.

The ultra high frequency energy to be measured is introduced into a coaxial line 41, 42 and is conducted into a resonant chamber 43, which is adjustable for providing an impedance match between the hot wire element 52 and the coaxial line 41, 42. The wire 52 is preferably a very fine wire such as a platinum wire constructed by the Wollaston process. Substantially the entire electromagnetic energy introduced into coaxial line 41, 42 is dissipated in the hot wire element 52 to be measured by the automatic bridge circuit arrangement of Fig. 1.

The resonant chamber 43 is adjusted by means of a sliding end wall 44. Resonant chamber 43 is provided with a conical cap 45 which is electrically insulated from the remainder of the chamber, the electrical insulation providing a capacitor 48 forming a substantial short circuit for ultra high frequency electromagnetic energy, but blocking direct current.

The inner conductor 42 of the transmission line 41 is passed through a slot 51 in the outer conductor and is attached to a sleeve 46 slidably mounted in resonant chamber 43. The outer conductor 41 is connected to the inner reentrant part of the resonator chamber 43 by sliding sleeve 46, adjustable as by means of knob 46'. The impedance coupling of the transmission line 41, 42 to the resonant chamber 43 may be adjusted to transfer substantially all the electromagnetic energy from the transmission line 41, 42 to the resonant chamber 43, while by adjusting the end wall 44 of the resonant chamber 43 by control member 44' the characteristics of the chamber 43 can be matched to the impedance of the hot wire element 52, thus insuring that substantially all the ultra high frequency energy introduced into the terminal apparatus is dissipated in the hot wire element 52 to be measured. Connections to the hot wire resistance element 52 and the compensating resistor 53 may be made by means of a pin connector unit 47 of well known type.

The compensating resistor 53 is preferably composed of material having the same temperature coefficient as hot wire element 52, whereby ambient temperature changes will be compensated for within the auxiliary bridge 52, 53, 54. Whereas the hot wire element 52 is of extremely small diameter and very short length, so that it undergoes an appreciable temperature rise in response to a very small increase of current therethrough, the compensating resistor 53 has ample heat capacity and appreciable surface area, as may be provided by a wire of considerable length and appreciable diameter, so that it does not respond to very small currents with appreciable temperature rise. Thus, while resistance elements 52 and 53 are equally responsive to changes of ambient temperature, preventing the auxiliary bridge 52, 53, 54 from being disturbed thereby, resistor 53 is substantially unresponsive to changes of the low frequency output energy from oscillator 108 in so far as its temperature and its resistance are concerned.

Returning now to Fig. 1, the input of bridge 50 is fed from oscillator 108 by connection to output transformer 112. The output of bridge 50 appears between variable arm 113 of potentiometer 109 and ground connection 114, and is fed back to the input of oscillator 108 as by way of coupling transformer 116, so as to maintain the oscillatory condition of oscillator 108.

Arm 113 of potentiometer 109 is set slightly off the balance point of bridge 50 in such manner that the two-stage amplifier system oscillates and supplies energy of low frequency to hot wire element 52. The consequent rise in resistance of this element 52 tends to restore the balance of bridge 50 and thus to decrease the amplitude of oscillations of oscillator 108 by decreasing the amount of feedback, thereby limiting its output and limiting the extent to which it heats element 52.

The fourth arm 52, 53, 54 of bridge 50 itself comprises an auxiliary bridge. Arm 55 of potentiometer 54 is adjusted so that in the absence of any ultra high frequency energy input to hot wire element 52, substantially zero low frequency voltage will appear at the input to low frequency amplifier 56 connected to the output of this auxiliary or secondary bridge.

As the temperature of the hot wire element 52 tends to increase due to the application thereto of ultra high frequency energy, the principal bridge 50 tends toward a condition of balance, and the amplitude of the low frequency energy produced by oscillator 108 consequently is decreased, thereby decreasing the low frequency voltage between wires 106 and decreasing the low frequency current through the hot wire element 52. The hot wire element 52 is thus automatically maintained substantially at the same operating temperature for all values of radio frequency energy being measured, the low frequency energy supplied thereto by oscillator 108 being reduced substantially to the same extent to which the ultra high frequency energy increases. By virtue of this feature, there is no requirement of manual rebalancing of the bridge.

With ultra high frequency energy being dissipated in the hot wire element 52, the resistance of the hot wire element 52 is higher than that of the compensating resistance 53, to a degree representing the amount of ultra high frequency power being dissipated, and the auxiliary bridge composed of resistances 52, 53 and 54 is unbalanced to a corresponding degree. Amplifier 56 accordingly receives an input signal at the oscillation frequency of oscillator 108 and of amplitude substantially proportional to the magnitude of the ultra high frequency input power supplied to the hot wire element 52. This low frequency signal is amplified, and the magnitude thereof may be determined and calibrated against the ultra high frequency signal input into hot wire element 52, thus serving to indicate the value of the ultra high frequency power absorbed by hot wire element 52.

In many instances, the ultra high frequency signal input into hot wire element 52 will be a modulated signal. Under these conditions, the oscillation magnitude in vacuum tube oscillator circuit 108 will follow the modulations of the high frequency signal, since the amount of feedback will vary with the modulation envelope. The low frequency input into amplifier 56 will then also be modulated in a manner corresponding to the modulations of the ultra high frequency signal input into hot wire element 52, so that the vacuum tube oscillator circuit 108 and bridge 50 will function to transfer modulations from the ultra high frequency signal, which is difficult to amplify, to the low frequency (of oscillator 108) which can be conveniently amplified. The circuit thus acts as a frequency converter or demodulator.

The output of amplifier 56 is detected in a balanced detector 57, then passed through filters 58 and 59 to suppress harmonics of the low frequency carrier, then into a compensating amplifier 60 to compensate for the non-linear characteristics of the hot wire element 52, and finally into an audio amplifier 61 and into a load 62, which may be a telephone receiver or a metering device. The compensating amplifier 60 is necessary because the hot wire does not readily follow higher modulation frequencies.

Figure 3:
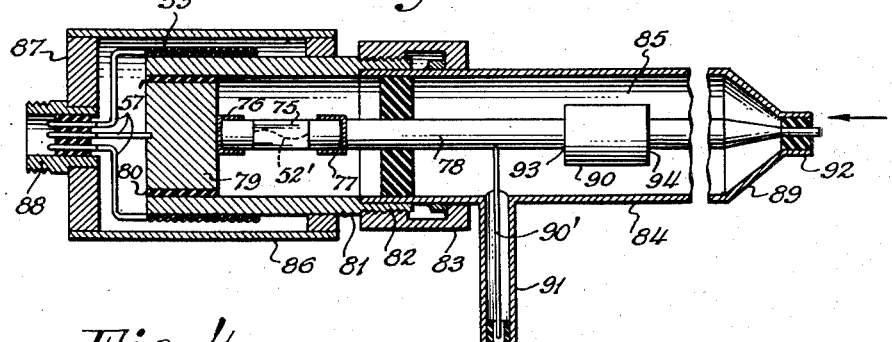
Figs. 3 and 4 are illustrative alternative embodiments of the ultra high frequency energy supply arrangement and the temperature-sensitive resistors.
Figure 4:
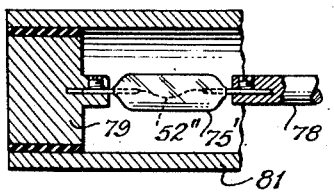

Figs. 3 and 4 illustrate alternative arrangements of the portion of the present invention including the high-temperature-coefficient resistor elements and the arrangement for supplying ultra high frequency energy to one of these elements. The features of the structures of Figs. 3 and 4 are described and claimed in copending application S. N. 170,574, filed June 27, 1950. The structure in Fig. 3 is arranged for the use of a low current fuse 75 of a commercially available type as the hot wire element. This fuse is held in clips 76 and 77, the latter being attached to the inner conductor 78 of the transformer 85, later to be described. Clip 76 is attached to end wall 79, which is insulated from outer tubular conductor 81 for low frequency energy by a thin cylinder 80 of dielectric material. Conductor 81 has a threaded portion 82 on its outer diameter opposite end wall 79. A nut 83 is provided on thread 82 for holding outer conductors 81 and 84 firmly together. This nut is so arranged that it may be unscrewed to permit disassembly and to facilitate replacement of fuse 75 in case of accidental burn-out. Attached to tube 81 is an outer concentric tube 86 extending past end wall 79 and closed by an apertured end wall 87. A cable connector 88 is provided in end wall 87 for connection to the three lead wires 57' which in turn are connected to the opposite ends of the ambient temperature compensation coil 53' and end wall 79. This coil is wound on the outer surface of tubular conductor 82 near end wall 79, so that it occupies a region surrounding the fuse 75.

A direct current circuit between fuse clip 77 and the outer conductor 84 of the transmission system is provided by a concentric line 90', 91 attached at right angles to tube 84, this concentric line being preferably a quarter-wavelength long. The diameter of inner conductor 90' preferably is made very small in relation to the inner diameter of the outer conductor 91, so that the line 90', 91 will present a high impedance value at its input end and will not appreciably disturb the field within conductor 84. The operation of the apparatus of Fig. 3 is similar to that of the apparatus shown in Fig. 2, the coil 53' having a high-temperature-coefficient of resistivity corresponding to that of the wire element 52' in the fuse 75, and the physical dimensions of the compensating element winding 53' being much greater than those of the hot wire element 52', in order that the temperature and the accompanying resistance value of the compensating winding 53' will be substantially free from responsiveness to changes of low frequency energy supplied by the oscillator 108.

A device for providing an impedance match to the ultra high frequency supply line is shown at 85. On the extended portion of inner conductor 78 is placed a sleeve 90 which a quarter-wavelength long. The concentric line 78, 84 may be connected to a supply line 92 of different diameter by a tapered section 89.

The procedure in matching the hot wire device to line 92 is as follows: With sleeve 90 removed, the fuse section ordinarily does not match line 92. Measured values of the impedance between conductors 78 and 84 then depend upon where the measurement is made. The point 93 is then found where the impedance is resistive and lower than the calculated impedance of line 92. A quarter-wave sleeve 90 is chosen of diameter such that when one end of it is at point 93, the impedance of the line at point 94 is equal to the impedance of line 92; i. e., the impedance of the section of line defined by sleeve 90 is the geometric mean between the impedance of line 92 and that of the measuring device. In practice, an approximation method may be used, in which one sleeve 90 is inserted, the measurement cycle repeated, and a second sleeve is inserted to accurately match the device to line 92. It will be evident to one skilled in the art that any type of coaxial impedance matching transformer may be used in place of transformer 85.

Fig. 4 is a fragmentary view which shows how a vacuum lamp 75' containing a filament 52'' may be employed in place of the fuse 75 for responding to power in excess of the power capability of the fuse unit 75 in Fig. 3. The lamp 75' may be filled with hydrogen, for even higher power capability.

With the Wollaston wire or fuse hot wire terminating devices of Figs. 2 and 3, it is found that measurements from $10^{-6}$ watts to ten milliwatts may be made. A vacuum lamp in the device of Fig. 4 will operate satisfactorily with ultra high frequency input power up to one half watt, and a hydrogen lamp in the device of Fig. 4 will operate satisfactorily for ultra high frequency power up to 50 watts.

Since many changes could be made in the above construction and many apparently widely different embodiments of this invention could be made without departing from the scope thereof, it is intended that all matter contained in the above description and shown in the accompanying drawings shall be interpreted as illustrative and not in a limiting sense.

What is claimed is:

1. Apparatus for measuring high frequency power comprising a bridge circuit, one arm of which comprises a resistor having a substantial temperature coefficient, means for heating said resistor to a predetermined operating temperature, means for additionally heating said resistor by said high frequency power to be measured whereby said resistor changes its resistance and causes unbalance of said bridge, and means for automatically returning said resistor to substantially said operating temperature.

2. In apparatus for measuring high frequency power, a main bridge circuit energized by a source of electrical energy, a hot wire resistor in an arm of said bridge, an auxiliary bridge circuit having said hot wire resistor in an arm thereof, means adapted to subject said hot wire resistor to said high frequency power, thereby increasing the resistance of said resistor and altering the condition of balance of each bridge circuit, means responsive to the output of said main bridge circuit for reducing energization of the main bridge circuit to maintain said resistor at substantially constant operating temperature, and means measuring the unbalance of the auxiliary bridge.

3. In apparatus for measuring small amounts of power, a main bridge circuit energized by a source of electrical energy, a resistor having the property of varying in electrical resistance in proportion to the energy dissipated therein, an auxiliary bridge circuit, said resistor being common to an arm of each of said bridge circuits, means adapted to subject said resistor to said power to be measured, thereby altering the resistance of said resistor and consequently the condition of balance of each bridge circuit, means responsive to the output of the main bridge circuit for controlling energization of said main bridge circuit for maintaining the resistance of said resistor substantially constant, and measuring means responsive to the unbalance of said auxiliary bridge.

4. Apparatus for measuring high frequency power comprising a measuring circuit embodying an energy sensitive member, means in said circuit for initially energizing said member to a predetermined condition, indicating means responsive to variations in said initial energizing means, means for additionally energizing said member by said high frequency power to be measured, and means for automatically reducing said initial energization proportionately to said additional energization so that said member is maintained substantially in said predetermined condition, said indicating means providing an indication of said high frequency power.

5. Apparatus for measuring high frequency power comprising a measuring circuit embodying a heat sensitive member, means in said circuit for initially energizing said member to a predetermined operating temperature, indicating means responsive to variations in said initial energizing means, means for additionally heating said member by said high frequency power to be measured, and means for automatically reducing said initial energization so that said member is maintained substantially at said predetermined temperature, said indicating means providing an indication of said high frequency power.

6. The apparatus defined in claim 5, wherein said heat sensitive member is an electrically energized resistor.

7. The apparatus defined in claim 5, wherein said heat sensitive member is an electrically energized resistor, and said indicating means comprises a bridge circuit containing said resistor in an arm thereof.

8. In a method of measuring high frequency power, the steps of heating a resistor having a substantial temperature coefficient with energy from a selected source until said resistor has a predetermined resistance value, subjecting said resistor to said high frequency power to be measured, thereby increasing the temperature of said resistor and consequently its resistance, automatically reducing the energy supplied from said selected source in inverse response to said increase in resistance of the resistor for the purpose of reducing the heating of said resistor until the resistor is restored to said predetermined resistance value, and measuring said energy reduction.

9. The method of measuring high frequency power by means of a bridge circuit having a Wollaston wire as one element thereof variable in resistance in accordance with excitation thereof, comprising the steps of exciting said element with alternating current of a frequency of the order of 10,000 cycles per second, balancing said bridge during said excitation of said element but in the absence of said high frequency power to be measured, further exciting said element by said power to vary its resistance and thereby unbalance said bridge, decreasing said alternating current to restore said bridge to balance, and indicating said reduction in alternating current excitation, whereby said high frequency power is indicated.

10. In a method of measuring high frequency power, the steps of heating a resistor having a substantial temperature coefficient with alternating current energy of a frequency of the order of 10,000 cycles per second until said resistor has a predetermined resistance value, further heating said resistor by said high frequency power to be measured, thereby increasing the temperature of said resistor and consequently its resistance, reducing said alternating current energy to reduce heating of said resistor until the resistor is restored to said predetermined value, and indicating said alternating-current energy reduction.

11. In a method of measuring high frequency power, the steps of initially energizing a measuring circuit to a predetermined operating condition where it consumes an initial amount of power, dissipating said high frequency power to be measured in said circuit so that the circuit consumes said high frequency power in addition to said initial power, reducing the initial energization of said circuit to restore said circuit to a power consumption equal to said initial amount without altering the amount of said high frequency power consumed by said circuit, and measuring said energization reduction which is a measure of the high frequency power dissipated in said circuit, said energy reduction step being automatic upon introduction of said high frequency power into said circuit.

12. In apparatus for measuring high frequency power, the combination comprising a resistor having a substantial temperature coefficient, electrical supply means for energizing said resistor to a predetermined operating temperature, means for supplying to said resistor a predetermined fraction of the high frequency power to be measured, thereby additionally heating said resistor, control means in said electrical supply means capable of reducing the power supplied therefrom to said resistor by an amount proportional to the high frequency power dissipated in said resistor, means responsive to variations in the temperature of said resistor for automatically controlling said power reduction, and means for measuring said power reduction.

13. In apparatus for measuring high frequency power, a bridge circuit adapted to be connected to a source of energy, a resistor having a substantial temperature coefficient in an arm of said bridge circuit and adapted to be heated to a normal operating temperature by energy from said source, means for supplying a predetermined fraction of said power to said resistor causing it to be further heated, control means for varying the energization of said resistor by said source, said control means being automatically responsive to changes in temperature of said resistor to restore said resistor to said normal operating temperature, and a measuring circuit effective only when said resistor is at normal operating temperature to indicate the high frequency power dissipated therein.

BETSY ROSS HANSEN,
*Executrix of the Estate of William W. Hansen, deceased.*

JOHN R. WOODYARD.
EDWARD L. GINZTON.

REFERENCES CITED

The following references are of record in the file of this patent:

UNITED STATES PATENTS

| Number | Name | Date |
|---|---|---|
| 2,399,481 | George | Apr. 30, 1946 |